(12) United States Patent
Schussler

(10) Patent No.: US 8,460,536 B2
(45) Date of Patent: Jun. 11, 2013

(54) DIAPHRAGM FOR ELECTROLYTIC CELL

(75) Inventor: Henry W. Schussler, Harrison City, PA (US)

(73) Assignee: Eagle Controlled 2 Ohio Spinco, Inc., Atlanta, GA (US)

( * ) Notice: Subject to any disclaimer, the term of this patent is extended or adjusted under 35 U.S.C. 154(b) by 1967 days.

(21) Appl. No.: 11/334,907

(22) Filed: Jan. 19, 2006

(65) Prior Publication Data

US 2007/0163890 A1      Jul. 19, 2007

(51) Int. Cl.
*C25B 13/08* (2006.01)
*C25B 1/46* (2006.01)

(52) U.S. Cl.
USPC ............ 205/517; 205/521; 205/522; 205/523

(58) Field of Classification Search
USPC .......................... 205/517–525; 204/252, 296
See application file for complete search history.

(56) References Cited

U.S. PATENT DOCUMENTS

| | | | |
|---|---|---|---|
| 3,385,915 A | 5/1968 | Hamling | |
| 4,126,535 A | 11/1978 | Balko et al. | |
| 4,165,271 A | 8/1979 | Kadija | |
| 4,169,774 A | 10/1979 | Kadija et al. | |
| 4,184,939 A | 1/1980 | Kadija | |
| 4,311,566 A | 1/1982 | McCann | |
| 4,315,061 A | 2/1982 | Ikeda et al. | |
| 4,409,085 A | 10/1983 | Kadija et al. | |
| 4,417,959 A | 11/1983 | Kadija et al. | |
| 4,437,951 A | 3/1984 | Bissot et al. | |
| 4,517,064 A | 5/1985 | Cook | |
| 4,559,124 A | 12/1985 | Divisek et al. | |
| 4,666,573 A | 5/1987 | DuBois et al. | |
| 4,680,101 A | 7/1987 | Darlington et al. | |
| 4,720,334 A | 1/1988 | DuBois et al. | |
| 4,869,793 A | 9/1989 | Kinney | |
| 5,188,712 A | 2/1993 | Dilmore et al. | |
| 5,192,401 A | 3/1993 | DuBois et al. | |
| 5,288,712 A | 2/1994 | Chen | |
| 5,470,449 A | 11/1995 | Bachot et al. | |
| 5,584,977 A | 12/1996 | Bachot et al. | |
| 5,612,089 A * | 3/1997 | Dilmore et al. | ............... 427/247 |
| 5,630,930 A | 5/1997 | Maloney | |
| 5,683,749 A | 11/1997 | DuBois et al. | |
| 5,720,933 A | 2/1998 | Scrinivasan | |
| 5,780,154 A | 7/1998 | Okano et al. | |
| 5,919,348 A | 7/1999 | Friedrich et al. | |
| 6,059,944 A | 5/2000 | DuBois et al. | |
| 6,296,745 B1 * | 10/2001 | DuBois et al. | ................. 204/266 |
| 6,299,939 B1 * | 10/2001 | DuBois et al. | ................. 427/243 |
| 6,352,660 B1 | 3/2002 | Friedrich et al. | |
| 6,395,080 B1 | 5/2002 | Cass et al. | |

FOREIGN PATENT DOCUMENTS

| | | |
|---|---|---|
| EP | 0 196 317 | 7/1990 |
| EP | 1 029 118 B1 | 8/2001 |
| EP | 0 865 517 B1 | 3/2002 |

OTHER PUBLICATIONS

U.S. Appl. No. 11/216,492, entitled "Method of Operating A Diaphragm Electrolytic Cell," filed Aug. 31, 2005.
U.S. Appl. No. 11/184,967, entitled "Diaphragm For Electrolytic Cell," filed Jul. 20, 2005.

* cited by examiner

*Primary Examiner* — Arun S Phasge
(74) *Attorney, Agent, or Firm* — The Webb Law Firm

(57) ABSTRACT

Describes a liquid-permeable diaphragm assembly for use in electrolytic cells, e.g., chlor-alkali electrolytic cells. The diaphragm assembly includes a foraminous cathode, a liquid permeable base mat comprising synthetic polymeric material that is at least partially resistant to the environment within the electrolytic cell on the foraminous cathode, and a topcoat of water-insoluble particulate material on the base mat. The topcoat is deposited on the base mat from an aqueous slurry comprising (i) at least one oxide, boride, carbide, nitride or silicate of a valve metal, (ii) clay mineral, (iii) hydrous metal oxide chosen from the hydrous oxides of magnesium, the hydrous oxides of zirconium, and mixtures of such hydrous metal oxides, and (iv) alkali metal polyphosphate.

20 Claims, No Drawings

DIAPHRAGM FOR ELECTROLYTIC CELL

FIELD OF THE INVENTION

The present invention relates to improved diaphragms for use in electrolytic cells for the electrolysis of inorganic materials, and to a method of electrolyzing inorganic materials in an electrolytic cell containing such an improved diaphragm. In a non-limiting embodiment of the present invention, the improved diaphragm is a synthetic diaphragm that is useful in chlor-alkali electrolytic cells.

BACKGROUND OF THE INVENTION

Electrochemical processing of inorganic chemicals in electrolytic diaphragm cells for the production of other inorganic materials is well known. The electrolytic cell typically comprises an anolyte compartment containing an anode, a catholyte compartment containing a cathode, and a microporous diaphragm that separates the anolyte compartment from the catholyte compartment. Diaphragms are used, for example, to separate an oxidizing electrolyte from a reducing electrolyte, a concentrated electrolyte from a dilute electrolyte, or an alkaline electrolyte from an acidic electrolyte.

A non-limiting example of a diaphragm electrolytic cell is the electrolytic diaphragm cell used for the electrolysis of aqueous alkali metal halide solutions, e.g., aqueous sodium chloride solutions. In such an electrolytic cell, the diaphragm is usually a portion of the cathode assembly, e.g., it is placed adjacent to or directly on the cathode, and separates the acidic liquid anolyte from the alkaline catholyte liquor. In the process of electrolyzing an aqueous alkali metal halide solution (brine) in the electrolytic diaphragm cell, liquid brine is introduced into the anolyte compartment of the cell and allowed to percolate through the brine-permeable microporous diaphragm into the catholyte compartment. The microporous diaphragm is sufficiently porous to allow the hydrodynamic flow of brine through it, while at the same time inhibiting the back migration of hydroxyl ions from the catholyte compartment into the anolyte compartment. When direct current is applied to the cell, halogen gas is evolved at the anode, hydrogen gas is evolved at the cathode, and an aqueous alkali metal hydroxide solution is formed in the catholyte compartment. In the case of aqueous sodium chloride solutions, the halogen produced is chlorine and the alkali metal hydroxide formed is sodium hydroxide. Catholyte liquor comprising alkali metal hydroxide and unconverted brine is removed from the catholyte compartment of the cell as cell liquor product.

A by-product produced in the aforedescribed electrolysis of aqueous sodium chloride solutions that is observed in the cell liquor product is chlorate ion ($ClO_3^-$) e.g., sodium chlorate. The presence of chlorate ion in the cell liquor affects the alkali metal hydroxide, e.g., sodium hydroxide, product quality, and also is corrosive to downstream processing equipment. Some commercial applications for alkali metal hydroxide require very low levels of chlorate ion. It is desirable, therefore, to minimize the amount of chlorate ion produced in a chlor-alkali electrolytic cell.

BRIEF SUMMARY OF THE INVENTION

In a non-limiting embodiment of the present invention, there is provided a diaphragm for an electrolytic cell comprising:

(a) a liquid-permeable base mat, said base mat comprising synthetic polymeric material that is at least partially resistant to the environment within said electrolytic cell, and (b) a coating of water-insoluble particulate material on said base mat, said water-insoluble particulate material having been deposited on said base mat from an aqueous slurry comprising:
  (i) at least one oxide, boride, carbide, nitride or silicate of a valve metal,
  (ii) clay mineral,
  (iii) hydrous metal oxide chosen from the hydrous metal oxides of magnesium or zirconium, or from mixtures of such hydrous metal oxides, and
  (iv) alkali metal polyphosphate.

In an alternate non-limiting embodiment of the present invention, there is provided a cathode assembly for an electrolytic cell comprising:

(a) a foraminous cathode, (b) a liquid-permeable base mat on said foraminous cathode, said base mat comprising synthetic polymeric material that is at least partially resistant to the environment within said electrolytic cell, and (c) a coating of water-insoluble particulate material on said base mat, said water-insoluble particulate material having been deposited on said base mat from an aqueous slurry comprising:
  (i) at least one oxide, boride, carbide, nitride or silicate of a valve metal,
  (ii) clay mineral,
  (iii) hydrous metal oxide chosen from the hydrous metal oxides of magnesium or zirconium, or from mixtures of such hydrous metal oxides, and
  (iv) alkali metal polyphosphate.

In another alternate non-limiting embodiment of the present invention, there is provided a cathode assembly for a chlor-alkali electrolytic cell comprising:

(a) a foraminous metal cathode, (b) a liquid-permeable base mat on said foraminous cathode, said base mat comprising fibrous polymeric tetrafluoroethylene material that is at least partially resistant to the environment within said chlor-alkali electrolytic cell, and (c) a coating of water-insoluble particulate material on said base mat, said water-insoluble particulate material having been deposited on said base mat from an aqueous slurry comprising:
  (i) at least one oxide or silicate of a valve metal,
  (ii) clay mineral,
  (iii) hydrous metal oxide chosen from magnesium hydroxide, zirconium hydroxide or mixtures of such hydrous metal oxides, and
  (iv) alkali metal polyphosphate.

DETAILED DESCRIPTION OF THE INVENTION

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used in the following description and claims, the following terms have the indicated meanings:

The term "chlor-alkali electrolytic cell" or terms of like import means an electrolytic cell for the production of halogen, e.g., chlorine, and alkali metal hydroxide, e.g., sodium hydroxide or potassium hydroxide, by the electrolysis of aqueous alkali metal halide solutions, e.g., aqueous sodium chloride or potassium chloride solutions. Such solutions are also frequently referred to as brine solutions or "brine".

The term "diaphragm" means a microporous, liquid-permeable material that separates the anolyte compartment from the catholyte compartment of a diaphragm electrolytic cell. In the case of a chlor-alkali electrolytic cell, the diaphragm may be, but is not limited to, an asbestos-type diaphragm, including the so-called polymer- or resin-modified asbestos diaphragm, e.g., asbestos in combination with polymeric resins such as fluorocarbon resins, or it may be a "synthetic diaphragm".

The term "electrolytic diaphragm cell" means an electrolytic cell for conducting an electrochemical process wherein a liquid electrolyte is passed through a diaphragm that separates the anolyte and catholyte compartments of the cell. In response to an electrical field that is generated between an anode contained in the anolyte compartment and a cathode contained in the catholyte compartment, the electrolyte is dissociated to form other chemical materials, e.g., inorganic materials. In one non-limiting embodiment, the electrolytic cell is a chlor-alkali cell wherein, for example, an aqueous sodium chloride solution undergoes electrolysis to produce as principal products an aqueous sodium hydroxide solution in the catholyte compartment and chlorine gas in the anolyte compartment.

The terms "on", "upon" or terms of like import mean that the referenced material is either directly connected to (superimposed on) the described surface, or indirectly connected to the object surface through one or more other layers (superposed on). In the case of the topcoat that is applied to the diaphragm base mat, the terms "on", "upon", etc mean that the topcoat is also within the porous areas of the base mat.

The terms "appended to", "affixed to", "adhered to" or terms of like import mean that the referenced material is directly connected to (superimposed on) the described surface.

The term "synthetic diaphragm" means a diaphragm that primarily comprises fibrous organic polymeric materials that are at least partially resistant to the environment, e.g., corrosive conditions, within the electrolytic cell, e.g., a chlor-alkali electrolytic cell, particularly the corrosive environments found in the anolyte and catholyte compartments of the cell. In one non-limiting embodiment, the synthetic diaphragm is substantially free of asbestos, i.e., the synthetic diaphragm contains not more than 5 weight percent of asbestos. In alternate non-limiting embodiments, the synthetic diaphragm contains not more than 3, e.g., not more than 2 or 1, weight percent of asbestos. In a further non-limiting embodiment, the synthetic diaphragm is totally free of asbestos (a non-asbestos-containing diaphragm). In a non-limiting embodiment, the synthetic diaphragm is substantially resistant to the environment, e.g., the internal corrosive conditions within the electrolytic cell.

The term "at least partially resistant to the environment within the electrolytic cell" or terms of like import means that the diaphragm is resistant to chemical and/or physical degradation, e.g., chemical dissolution and/or mechanical erosion, by the conditions within the electrolytic cell, e.g., the corrosive conditions present in the anolyte compartment and/or the catholyte compartment, for a reasonable period of cell operation. Generally, a reasonable period of cell operation will depend upon and be a function of the type of cell used and the cell's operating conditions. In a non-limiting embodiment, a reasonable life span for a synthetic diaphragm of the type described herein that is used in a chlor-alkali electrolytic cell will range from 30 to 96 months. During that life span the diaphragm is doped with dopant material, as is well known in the art.

The term "dopant material" means inorganic particulate material that is applied to the diaphragm, e.g., to the surface of the diaphragm, to adjust the microporosity of the diaphragm when the electrolytic cell containing the diaphragm is operating. In a non-limiting embodiment, dopant materials include inorganic particulate material that are used to form the coating on the base mat of the diaphragm. Non-limiting examples of dopant materials include clay minerals, the oxides of valve metals, e.g., titanium and zirconium, and the oxides and hydroxides of alkaline earth metals, e.g., magnesium hydroxide.

The term "fluorocarbon fiber" means fluorine-containing polymeric hydrocarbon fibers, e.g., polytetrafluoroethylene. The polymeric fluorocarbon fiber may also contain other halogens, e.g., chlorine, such as polychlorotrifluoroethylene, and can comprise a mixture of halogen-containing polymer fibers.

The term "valve metal" means the metals including, but not limited to, vanadium, chromium, zirconium, niobium, molybdenum, hafnium, tantalum, titanium and tungsten.

The term "at least one oxide, boride, carbide, nitride or silicate of a valve metal" means and includes one or more valve metal oxide, boride, carbide, nitride or silicate and mixtures of one or more valve metal oxide, boride, carbide, nitride or silicate.

For purposes of convenience, the following disclosure is directed specifically to chlor-alkali diaphragm electrolytic cells; but as one skilled in the art can appreciate, the diaphragm of the present invention is also applicable to other diaphragm-containing electrolytic cells that are used for conducting electrochemical processing of inorganic chemicals. In a non-limiting embodiment, the diaphragm of the present invention is used for the electrolysis of aqueous inorganic metal salt solutions such as alkali metal halide solutions, e.g., aqueous sodium chloride or potassium chloride solutions.

A variety of electrolytic diaphragm cells (electrolyzers) known to those skilled in the art can be used for the electrolysis of aqueous alkali metal halide solutions. In a non-limiting embodiment, the electrolyzers can be monopolar or bipolar electrolytic cells that contain planar and non-planar electrodes, e.g., cathodes. Generally, the electrolysis of aqueous alkali metal halide solutions is performed in a plurality of housings comprising a plurality of individual electrolytic cell units wherein a succession of anode units alternate with cathode assemblies. In one non-limiting embodiment, the electrolyzer is a bipolar electrolyzer wherein substantially vertical cathode assemblies are interleaved or positioned within and spaced from substantially vertical anodes. This type of electrode assembly has been referred to as a fingered configuration, e.g., wherein a series of cathode fingers and anode fingers are interleaved with one another.

The cathode of a diaphragm electrolytic cell generally comprises a liquid-permeable substrate, e.g., a foraminous cathode. In a non-limiting embodiment, the cathode is metallic. The metal cathode is electroconductive and can be a perforated sheet, a perforated plate, metal mesh, expanded metal mesh, woven screen, an arrangement of metal rods or the like having equivalent openings (nominal diameter) generally in the range of from 0.05 inch (0.13 cm) to 0.125 inch (0.32 cm). In an alternate non-limiting embodiment, the openings in the foraminous metal cathode range from 0.07 inch (0.17 cm) to 0.1 inch (0.25 cm). In a non-limiting embodiment, the metal cathode is fabricated of iron, an iron alloy or some other metal, such as nickel, that is at least partially resistant to the environment, e.g., the corrosive conditions, within the operating electrolytic cell to which the cathode is exposed, e.g., the corrosive conditions with the anolyte and catholyte compartments of an operating chlor-alkali electrolytic cell.

Electrolysis of alkali metal halide brines generally involves charging an aqueous solution of the alkali metal halide salt, e.g., sodium chloride brine, to the anolyte compartment of the cell. The alkali metal halide brine typically contains alkali metal halide in concentrations of from 24 to 26 percent by weight. The aqueous brine percolates through the liquid-permeable microporous cathode assembly into the catholyte compartment and then is withdrawn from the cell. With the application of an electric potential, e.g., direct electric current, across the anode and cathode of the cell, electrolysis of a portion of the percolating alkali metal halide brine occurs, and halogen gas, e.g., chlorine, is produced at the anode, while hydrogen gas is produced at the cathode. An aqueous solution of alkali metal hydroxide, e.g., sodium hydroxide, is produced in the catholyte compartment from the combination of alkali metal ions with hydroxyl ions. The resultant catholyte liquor, which comprises principally alkali metal hydroxide and depleted alkali metal halide brine, e.g., cell liquor, is withdrawn from the catholyte compartment. The alkali metal hydroxide product is subsequently separated from the catholyte liquor.

Historically, asbestos has been the most common diaphragm material used in chlor-alkali electrolytic diaphragm cells for the electrolysis of alkali metal halide brines because of its chemical resistance to the corrosive conditions that exist in such electrolytic cells. Asbestos in combination with various polymeric resins, particularly fluorocarbon resins (the so-called polymer- or resin-modified asbestos diaphragms) have been used also as diaphragm materials in such electrolytic cells. More recently, synthetic diaphragms, e.g., non-asbestos-containing diaphragms, have been developed for use in chlor-alkali diaphragm electrolytic cells.

Synthetic diaphragms are typically fabricated from fibrous polymeric materials that are resistant to the corrosive conditions present within the electrolytic cell, such as a chlor-alkali cell, e.g., the corrosive environments found in the anolyte and catholyte compartments. Generally, the synthetic diaphragm is formed on the foraminous cathode by vacuum depositing (in one or more steps) materials comprising the diaphragm onto the foraminous cathode substrate from a slurry, e.g., an aqueous slurry, of those materials.

In a non-limiting embodiment, synthetic diaphragms used in chlor-alkali electrolytic cells, are prepared using fibrous organic polymers. Examples of useful fibrous organic polymers include, but are not limited to, polymers, copolymers, graft polymers or combinations of polymers that are at least partially chemically resistant, e.g., substantially chemically resistant, to the corrosive conditions in which the diaphragm is employed, e.g., chemically resistant to degradation by exposure to the reactants, products and co-products present in the anolyte and catholyte compartments. Such products and co-products include, but are not limited to sodium hydroxide, chlorine and hydrochloric acid.

In a non-limiting embodiment, the fibrous organic polymers are halogen-containing polymer fibers. Non-limiting examples of halogen-containing polymer fibers include fluorine-containing polymer fibers, fluorine and chlorine-containing polymer fibers, such as perfluorinated polymer fibers, e.g., fluorocarbon fibers, and chlorine-containing polymer fibers that include fluorine, and mixtures of such halogen-containing polymer fibers. Examples of halogen-containing polymers and copolymers include, but are not limited to, polyvinyl fluoride, polyvinylidene fluoride, polytetrafluoroethylene (PTFE), polyperfluoro(ethylene-propylene), polytrifluoroethylene, polyfluoroalkoxyethylene (PFAE) polymer, polychlorotrifluoroethylene (PCTFE) polymer and the copolymer of chlorotrifluoroethylene and ethylene (CTFE polymer). Generally, the synthetic diaphragm is formed from a composition comprising a fluorine-containing polymer such as polytetrafluoroethylene.

A desired property of the synthetic diaphragm is its ability to wick (wet) the electrolyte, e.g., the aqueous alkali metal halide solution, which percolates through the diaphragm. To provide the property of wettability, the synthetic diaphragm generally further comprises ion-exchange materials having cation selective groups thereon, e.g., acid groups. In a non-limiting embodiment, the acid groups include, but are not limited to, sulfonic acid groups, carboxylic acid groups and their derivatives, e.g., esters, phosphonic acid groups, and phosphoric acid groups. Generally, the acid group is either a sulfonic acid groups or a carboxylic acid group.

In a non-limiting embodiment, the ion-exchange material is a perfluorinated copolymer material prepared from the polymerization of a fluorovinyl ether monomer containing a functional group, e.g., an ion-exchange group or a functional group easily converted into an ion-exchange group, and a monomer chosen from fluorovinyl compounds, such as vinyl fluoride, vinylidene fluoride, trifluoroethylene, tetrafluoroethylene, hexafluoroethylene, hexafluoropropylene, chlorotrifluoroethylene and perfluoro(alkylvinyl ether), with the alkyl portion of the alkylvinyl group being an alkyl group containing from 1 to 10 carbon atoms. A description of such ion-exchange materials can be found in column 5, line 36 through column 6, line 2 of U.S. Pat. No. 4,680,101, which disclosure is incorporated herein by reference. Generally, an ion-exchange material with sulfonic acid functionality is used. A perfluorosulfonic acid ion-exchange material (5 weight percent solution) is available from E.I. du Pont de Nemours and Company under the trade name NAFION. Other appropriate halogenated ion-exchange materials that can be used to allow the diaphragm to wick the aqueous brine fed to the anolyte compartment of the electrolytic cell include, for example, the ion-exchange material available from Asahi Glass Company, Ltd. under the trade name FLEMION.

Organic polymeric materials in the form of microfibrils are also generally used to prepare synthetic diaphragms. Such microfibrils can be prepared in accordance with the method described in column 1, line 39 through column 2, line 45 of U.S. Pat. No. 5,030,403, which disclosure is incorporated herein by reference. The fibers and microfibrils of the organic polymeric material, e.g., PTFE fibers and PTFE microfibrils, generally comprise the predominant portion of the diaphragm solids. As the ion-exchange material is often more costly than the polymer fibers and microfibrils, the diaphragm generally comprises from 65 to 93 percent by weight combined of such polymer fibers and microfibrils and from 0.5 to 2 percent by weight of the ion-exchange material.

The organic fibrous polymers of the synthetic diaphragm are generally used in particulate form, e.g., in the form of particulates or fibers, as is well known in the art. In the form of fibers, the organic polymer material generally has a fiber length of up to 0.75 inch (1.91 cm) and a diameter of from 1 to 250 microns. Polymer fibers comprising the diaphragm can be of any suitable denier, e.g., commercially available polymer fibers. In one non-limiting embodiment, the PTFE fiber used to prepare synthetic diaphragms is a 0.25 inch (0.64 cm) chopped 6.6 denier fiber; however, other lengths and fibers of smaller or larger deniers can be used.

In addition to the aforedescribed fibers and microfibrils of halogen-containing polymers and ion-exchange materials, the liquid slurry used to deposit the synthetic diaphragm on the foraminous cathode can also include other materials. Such other materials include, but are not limited to, materials such as thickeners, surfactants, antifoaming agents, antimicrobial agents and other polymers, e.g., polyethylene. Further, materials such as fiberglass can also be incorporated into the diaphragm. A non-limiting example of the components of a synthetic diaphragm material useful in a chlor-alkali electrolytic cell can be found in Example 1 of U.S. Pat. No. 5,188, 712, the disclosure of which synthetic diaphragm composition in such example is incorporated herein by reference.

The diaphragm of an electrolytic cell, e.g., a chlor-alkali electrolytic cell, is generally deposited onto the foraminous cathode from a slurry of components comprising the diaphragm. In one non-limiting embodiment, the continuous phase of the slurry comprises an aqueous liquid medium such as water. Such an aqueous slurry generally comprises from 1 to 6 weight percent solids, e.g., from 1.5 to 3.5 weight percent solids, of the diaphragm components, and has a pH of between 8 and 11. The appropriate pH can be obtained by the addition of an alkaline reagent, such as alkali metal hydroxide, e.g., sodium hydroxide, to the slurry.

The amount of each of the components comprising the synthetic diaphragm can vary in accordance with variations known to those skilled in the art. In one non-limiting embodiment, the following approximate amounts (as a percentage by weight of the total slurry having a percent solids of between 1 and 6 weight percent) of the diaphragm components in a slurry used to deposit a synthetic diaphragm can be used: polyfluorocarbon fibers, e.g., PTFE fibers,—from 0.25 to 1.5 percent; polyfluorocarbon microfibrils, e.g., PTFE microfibrils,—from 0.6 to 3.8 percent; ion-exchange material, e.g., NAFION resin,—from 0.01 to 0.05 percent; fiberglass—from 0.0 to 0.4 percent; and polyolefin, e.g., polyethylene, such as SHORT STUFF®, available from Minifibers, Inc.—from 0.06 to 0.3 percent.

The aqueous slurry comprising the synthetic diaphragm components can also contain a viscosity modifier or thickening agent to assist in the dispersion of the solids, e.g., the perfluorinated polymeric materials, in the slurry. For example, a thickening agent such as CELLOSIZE® thickening agent material (available from the Dow Chemical Company, can be used. In a non-limiting embodiment, from 0.1 to 5 percent by weight of thickening agent can be added to the slurry mixture, basis the total weight of the slurry. In an alternate non-limiting embodiment, from 0.1 to 2 percent by weight thickening agent can be used.

A surfactant may, if desired, be added to an aqueous slurry of synthetic diaphragm components to assist in obtaining an appropriate dispersion. In a non-limiting embodiment, the surfactant is a nonionic surfactant and is used in amounts of from 0.1 to 3 percent, e.g., from 0.1 to 1 percent, by weight, based on the total weight of the slurry. A non-limiting example of a nonionic surfactant is chloride capped ethoxylated aliphatic alcohols, wherein the hydrophobic portion of the surfactant is a hydrocarbon group-containing from 8 to 15, e.g., 12 to 15, carbon atoms, and the average number of ethoxylate groups ranges from 5 to 15, e.g., 9 to 10. An example of such a nonionic surfactant includes, but is not limited to, the commercially available surfactant AVANEL® N-925 non-ionic surfactant, available from BASF Corporation.

Other additives that can be incorporated into the aqueous slurry of synthetic diaphragm forming components include, but are not limited to, antifoaming amounts of an antifoaming agent, such as UCON® 500 antifoaming compound, available from the Dow Chemical Company, to prevent the generation of excessive foam during mixing of the slurry, and an antimicrobial agent to prevent the digestion of cellulose-based components by microbes during storage of the slurry. A non-limiting example of an antimicrobial is UCARCIDE® 250, which is available from the Dow Chemical Company. Other antimicrobial agents known to those skilled in the art also can be used. In alternate non-limiting embodiments, antimicrobials are incorporated into the aqueous slurry of synthetic diaphragm components in amounts of from 0.05 to 0.5 percent by weight, e.g., between 0.08 and 0.2 weight percent.

In a non-limiting method, the base mat, e.g., a base mat comprising synthetic polymeric materials, is deposited directly on the foraminous cathode using a vacuum deposition process. In a non-limiting example of such a deposition process, the foraminous cathode is immersed in an aqueous slurry containing the components comprising the base mat, and the slurry is drawn through the cathode with the assistance of negative pressure, e.g., a vacuum, applied to the cathode, thereby depositing or laying down a layer comprising the base mat materials. After depositing the base mat onto the foraminous cathode, the base mat may be dried, if desired, prior to placing the topcoat onto the base mat. Alternatively, the base mat may not be dried and the topcoat of inorganic particulate material deposited directly onto the wet base mat.

The base mat of the diaphragm commonly has at least one coating of water-insoluble inorganic particulate material applied on top of and within the interstices of the base mat, e.g., the synthetic diaphragm. Such coating is often referred to as a topcoat, and in a non-limiting embodiment is applied to, e.g., deposited on and within, the base mat by drawing an aqueous slurry comprising the water-insoluble inorganic particulate material through the previously formed base mat by use of a vacuum, e.g., by means of a vacuum deposition process.

In accordance with a non-limiting embodiment of the present invention, the aqueous slurry of inorganic particulate material comprises:

(i) at least one oxide, boride, carbide, nitride or silicate of a valve metal, (ii) clay mineral, (iii) hydrous metal oxide chosen from the hydrous metal oxides of magnesium or zirconium, or from mixtures of such hydrous metal oxides, and (iv) alkali metal polyphosphate.

Use of a coating (topcoat) on the base mat that has been deposited from the foregoing slurry of inorganic particulate material has been observed to reduce or minimize the amount of chlorate ion (as sodium chlorate) in the cell liquor removed from the catholyte compartment of a chlor-alkali electrolytic cell.

In an alternate non-limiting embodiment, the oxide, boride, carbide, nitride or silicate valve metal particulate material is chosen from an oxide, silicate or mixtures of oxides and silicates of at least one valve metal. In a further alternate non-limiting embodiment, the valve metal particulate material is a metal oxide of at least one valve metal. Of the valve metals, titanium and zirconium are non-limiting examples of valve metals that are commonly used. Non-limiting examples of valve metal oxides are titanium oxide and zirconium oxide. In alternate non-limiting embodiments of the present invention, the oxide, boride, carbide, nitride and/or silicate valve metal particulate material, e.g., the valve metal oxide, represents from 40 to 90 weight percent, e.g., from 50 or 55 to 80 weight percent, (on a solids basis) of the aqueous slurry of inorganic particulate material. Based on a total solids content of 10 grams per liter (gpl), a range of 50 to 80 weight percent represents from 5 to 8 gpl. The amount of the aforedescribed valve metal particulate material present in the topcoat slurry can range between any of the aforedescribed stated upper and lower values, inclusive of the recited values.

The water-insoluble particulate clay mineral can be chosen from a variety of clay materials known to those skilled in the art. Non-limiting examples of clay minerals that can be chosen for use in the topcoat slurry include the naturally occurring hydrated silicates of metals, such as aluminum and magnesium, e.g., kaolin, meerschaums, augite, talc, vermiculite, wollastonite, montmorillonite, illite, glauconite, attapulgite, sepiolite, hectorite and mixtures of such clay minerals. Of the aforementioned clay minerals, attapulgite and hectorite and/or mixtures of such clay minerals are examples of clays that are commonly used. Such clays are hydrated magnesium silicates and magnesium aluminum silicates, which inorganic particulate materials may also be prepared synthetically. Attapulgite clay is available commercially under the trade name ATTAGEL. In alternate non-limiting embodiments of the present invention, the clay mineral particulate material represents from 15 to 60 weight percent, e.g., from 18.5 to 40 weight percent, (on a solids basis) of the aqueous slurry of inorganic particulate material. Based on a total solids content of 10 grams per liter (gpl), a range of 18.5 to 40 weight percent represents from 1.85 to 4 gpl. The amount of clay mineral present in the topcoat slurry can range between any of the aforedescribed stated upper and lower values, inclusive of the recited values.

In accordance with a described embodiment of the present invention, the topcoat placed on the base mat also contains hydrous metal oxide chosen from the hydrous oxides of magnesium, the hydrous oxides of zirconium, and mixtures of the hydrous oxides of magnesium and zirconium. Magnesium hydroxide [CAS 1309-42-8] is commercially available, e.g., as a powder. It is sold, for example, by the Rohm and Haas Company under the trade names MARINCO H and VERSA-MAG. Zirconium hydroxide [CAS 14475-63-9] is a known material and can be prepared synthetically by methods known to those skilled in the art. Hydrous zirconium oxide hydrate [12164-98-6] ($ZrO_2 \cdot nH_2O$) is also a known hydrous oxide of zirconium. In alternate non-limiting embodiments of the present invention, the aforementioned hydrous metal oxide particulate material represents from 0.5 to 33 weight percent, such as from 5 to 25 weight percent, e.g., 18.5 weight percent (on a solids basis) of the aqueous slurry of inorganic particulate material. Based on a total solids content of 10 grams per liter (gpl), a range of 5 to 25 weight percent represents from 0.5 to 2.5 gpl. The amount of hydrous metal oxide present in the topcoat slurry can range between any of the aforedescribed stated upper and lower values, inclusive of the recited values.

In accordance with an embodiment of the present invention, the slurry of water-insoluble inorganic particulate material also contains alkali metal polyphosphate, e.g., sodium polyphosphate, potassium polyphosphate and mixtures of such polyphosphates, as a material that enhances the dispersion of the particulate material. The polyphosphate may be a hydrated polyphosphate, a dehydrated polyphosphate or a mixture of hydrated and dehydrated polyphosphates. In a non-limiting embodiment, the alkali metal polyphosphate is present in the topcoat slurry in an amount of at least 0.01 weight percent. In an alternate non-limiting embodiment, the alkali metal polyphosphate is present in amounts of at least 0.1 weight percent. In a non-limiting embodiment, the alkali metal polyphosphate is present in the topcoat slurry in amounts of not more than 2 weight percent. In alternate non-limiting embodiments, the alkali metal polyphosphate is present in the topcoat slurry in amounts of not more than 1 weight percent, e.g., not more than 0.5 weight percent. The amount of alkali metal polyphosphate present in the topcoat slurry can range between any of the aforedescribed stated upper and lower values, inclusive of the recited values. Since the alkali metal polyphosphate is soluble in the topcoat slurry, it is not included in the calculation of the solids present in the topcoat slurry.

Non-limiting examples of alkali metal polyphosphates include tetraalkali metal pyrophosphate, e.g., tetrasodium pyrophosphate and tetrapotassium pyrophosphate, alkali metal triphosphate, e.g., sodium triphosphate and potassium triphosphate, alkali metal tetraphosphate, e.g., sodium tetraphosphate, alkali metal hexametaphosphate, e.g., sodium hexametaphosphate, and mixtures of such polyphosphates.

The mean particle size of inorganic particulate material used in the topcoat slurry or as a dopant material can vary. In a non-limiting embodiment, the mean particle size can range from 0.1 to 20 microns, e.g., from 0.1 to 0.5 microns. For example, a commercially available attapulgite clay has a mean particle size of 0.1 microns.

The amount of inorganic particulate material in the topcoat slurry can vary and will depend on the amount that is required for the particular diaphragm used. In a non-limiting embodiment, the topcoat slurry can contain from 1 to 15 grams per liter (gpl) of inorganic particulate material. In alternate non-limiting embodiments, the amount of inorganic particulate in the topcoat slurry can vary from 5 to 15 gpl, e.g., 8 to 12 gpl.

In accordance with a non-limiting embodiment, the aqueous portion of the slurry of water-insoluble particulate material can be chosen from water or aqueous solutions comprising the inorganic material that is to be electrolyzed, e.g., alkali metal halide salts such as sodium chloride, e.g., the aqueous brine fed to the anolyte compartment.

The topcoat of water-insoluble particulate material is placed on the diaphragm base mat, e.g., affixed to the diaphragm base mat such as the synthetic diaphragm base mat. In a non-limiting method, the coating of water-insoluble particulate material is deposited directly on the diaphragm base mat using a vacuum deposition process. In a non-limiting example of such a deposition process, the cathode assembly comprising the foraminous cathode and diaphragm base mat is immersed in the aqueous slurry of water-insoluble particulate material comprising the coating, and the slurry is drawn through the cathode assembly with the assistance of negative pressure, e.g., a vacuum, applied to the cathode assembly, thereby depositing or laying down a relatively thin layer of the water-insoluble particulate materials over (and within) the base mat. Vacuum deposition of the topcoat allows the particulate solids of the topcoat slurry to be drawn into the porous areas of the base mat and to be deposited onto the surface of the base mat, which results in a diaphragm of relatively uniform porosity.

The slurry of water-insoluble particulate material can be prepared by adding the components of the slurry to a large tank, e.g., the deposition tank, containing the slurry medium, e.g., water, and agitating the slurry, e.g., by air sparging and/or by mechanical mixing, e.g., using a paddle-type mixer, until a substantially homogeneous slurry is formed. The mixing time and degree of agitation is chosen to accomplish the desired dispersion, as is well known to those skilled in the art. Air lancing of the slurry can be used to insure that there are no layers of particulates on the bottom of the vessel used to prepare the topcoat slurry.

In the case where the coating is applied to the diaphragm base mat by vacuum deposition, the slurry of inorganic particulate material is drawn through the base mat assembly until the desired base weight of the topcoat is achieved. In a non-limiting embodiment, the slurry of particulate material is drawn through the base mat until no additional topcoat slurry can be pulled through the diaphragm. The slurry of particulate material may be agitated during the coating deposition process (if required) to insure that the components of the slurry do not settle, e.g., so that the slurry remains uniform and substantially homogeneous. The level of vacuum used to deposit a coating of the inorganic particulate material on the base mat can vary. In a non-limiting embodiment, the vacuum used is that negative pressure that is sufficient to draw the particulate material slurry through the cathode assembly until the desired thickness of the topcoat is obtained, and subsequently hold the topcoat against the base mat until the topcoat and base mat are dewatered. Generally, vacuum pressures can vary from 12 to 750 mm of mercury, e.g., from 600 to 720 mm of mercury.

In a non-limiting embodiment, the cathode assembly containing the deposited particulate material topcoat is removed from the slurry while a vacuum is maintained on the cathode assembly in order to dewater the topcoat and base mat. Alternatively, the slurry is drained from the deposition tank and the cathode assembly is retained in the empty tank (while maintaining vacuum on the cathode assembly) in order to dewater the topcoat and base mat. Once the topcoat and base mat are sufficiently dewatered to maintain the integrity of the topcoat, the vacuum on the cathode assembly can be broken.

Following deposition and dewatering of the inorganic particulate coating on the diaphragm base mat, the coating may be dried prior to use in an electrolytic cell. In a non-limiting embodiment, the coated diaphragm assembly is dried by placing it in a furnace, e.g., a circulating air furnace, at temperatures sufficient to dry the topcoat, but below a temperature at which materials comprising the base mat would be degraded and impair use of the diaphragm for its intended purpose. In a non-limiting embodiment, drying temperatures can vary between 140° F. and 160° F. (60° C. and 71° C.). A vacuum can be maintained on the coated diaphragm during drying if it is deemed necessary to do so.

Drying is performed over a period of time sufficient to result in substantial removal of water within the topcoat and base mat. In a non-limiting embodiment, drying is performed over a time period than can range from 2 to 20 hours. To assist in the drying, air can be pulled through the diaphragm assembly by attaching it to a vacuum system.

The diaphragm of an electrolytic cell, e.g., a chlor-alkali electrolytic cell, is liquid-permeable, thereby allowing an electrolyte, such as sodium chloride brine, subjected to a pressure gradient to pass through the diaphragm. Generally, the pressure gradient in a diaphragm electrolytic cell is the result of a hydrostatic head on the anolyte side of the cell, e.g., the liquid level in the anolyte compartment will be on the order of from 1 to 65 inches (2.54-165 cm) higher than the liquid level of the catholyte compartment. The specific flow rate of electrolyte through the diaphragm can vary, and depends in part on the type of the cell and the height of the hydrostatic head. In a chlor-alkali cell, the diaphragm is microporous and is generally prepared in such a manner that it is able to pass from 0.001 to 0.5 cubic centimeters of anolyte per minute per square centimeter of diaphragm surface area. The flow rate is generally set at a rate that allows production of a predetermined, targeted concentration of the principal product formed in the catholyte compartment. In a chlor-alkali electrolytic cell, the principal product formed in the catholyte compartment is alkali metal hydroxide, e.g., sodium hydroxide. Typically, synthetic diaphragms used in chlor-alkali cells, have a porosity (permeability) similar to that of asbestos-type and polymer resin modified asbestos diaphragms.

The thickness of the diaphragm used in electrolytic cells can vary and will depend on the type of electrolytic cell used and the nature of the electrochemical process being performed. In the case of chlor-alkali electrolytic cells, diaphragms, e.g., synthetic diaphragms, generally have a thickness of from 0.075 to 0.25 inches (0.19 to 0.64 cm), and a weight per unit area ranging from 0.3 to 0.6 pounds per square foot (1.5 to 2.9 kilograms per square meter) of the cathode. Following preparation of the coated base mat diaphragm assembly, the assembly can be used in an electrolytic cell, e.g., in a chlor-alkali electrolytic cell, as the cathode assembly.

During cell operation, it is common to "dope" the surface of the diaphragm with dopant material to adjust the microporosity of the diaphragm. Dopant material is added to the anolyte compartment of the cell and is deposited on the surface of the diaphragm as the anolyte percolates through the diaphragm. In a non-limiting embodiment, the dopant material can be chosen from materials that include clay minerals, and the oxides and hydrous metal oxides of valve metals, e.g., the valve metals titanium and zirconium. The dopant materials can be added to a liquid carrier, e.g., water or liquid electrolyte such as sodium chloride brine, and charged to the anolyte compartment of the electrolytic cell during cell operation.

The present invention is more particularly described in the following examples, which are intended as illustrative only, since numerous modifications and variations therein will be apparent to those skilled in the art.

In the following examples, all reported percentages are weight percents, unless noted otherwise or unless indicated as otherwise from the context of their use. The reported efficiencies of the chlor-alkali electrolytic cells are "caustic efficiencies", which are calculated by comparing the amount of sodium hydroxide collected over a given time period with the theoretical amount of sodium hydroxide that would be generated applying Faraday's Law. The cell efficiencies reported in Examples 1 and 2 are corrected caustic cell efficiencies, which is the calculated caustic cell efficiency value that has been corrected to a cell having a theoretical 50% brine depletion (50% of the incoming sodium chloride brine is converted to chlorine and sodium hydroxide). Corrected caustic cell efficiencies are used in order to compare different operating cells on the same basis. The reported weight density of layers placed on the foraminous cathode is based upon the dry weight of the layer per unit area.

A synthetic base mat pelt was used in the following examples. The base mat pelt was prepared by vacuum depositing materials comprising the base mat onto a screen from an aqueous slurry of those materials. The base mat pelt comprised the following particulate ingredients: 63.7 weight percent PTFE microfibrils, 25.1 weight percent PTFE floc (fibers), 5.6 weight percent SHORT STUFF polyethylene, 4.7 weight percent fiberglass, and 0.9 weight percent NAFION ion exchange resin.

The base mat pelt had a reported weight density of 0.458 pounds/square foot (2.23 kg/m$^2$).

Example 1

A topcoat slurry of inorganic particulate material was prepared in the laboratory at ambient conditions by the following procedure. 3.01 grams of tetrasodium pyrophosphate were added to a 4 liter Nalgene polyethylene beaker containing 2,500.4 grams of deionized water. The beaker was equipped with a Caframo M/N RZR-1 mixer equipped with a 10-inch Teflon coated shaft and collapsible paddle, which operated at 650 rpm. After about 10 minutes of mixing (in which the tetrasodium pyrophosphate dissolved in the deionized water), 22.03 grams of zirconium dioxide (Zirox 180) was added to the water and allowed to mix for 4 minutes. Clay mineral (Attagel 36) in the amount of 5.56 grams was then added to the mixing slurry and allowed to mix for 3 minutes. Magnesium hydroxide (Fisher, C/N M342-500, L/N 986460) in the amount of 2.27 grams was then added to the slurry and allowed to mix for 3 minutes. 2.84 grams of Avanel N-925 nonionic surfactant was then added to the solution followed immediately by 500.2 grams of additional deionized water. The slurry was mixed for an additional 3 minutes and then transferred to a 1 gallon (3.8 liters) Nalgene container. The final pH of the slurry was observed to be 10.98.

The synthetic base mat pelt was cut into squares 3$^{15}/_{16}$ inches (10 cm) on a side. One square of the base mat pelt was placed on top of a titanium screen retained in a depositing block. An EPDM (ethylene-propylene-diene monomer) gasket $^1/_{16}$ inch (0.16 cm) thick with an internal open dimension of 3$^9/_{16}$ inches (9 cm) square was placed on top of the pelt. A steel frame of the same dimensions as the gasket was placed over the gasket and clamped to the depositing block forming a seal around the pelt with a depositable area of 0.088 square feet (0.0082 square meters). The depositing block was placed in a vessel filled with the previously described topcoat slurry and connected to a water aspirator vacuum source. Full vacuum was applied for 20 minutes, which resulted in pulling 350 milliliters of filtrate through the pelt at a final vacuum of 29.5 inches (75 cm) of mercury. During the 20 minute deposition period, the depositing block was raised and lowered three times each at intervals of 1, 3, 5, 7 and 15 minutes in order to agitate the topcoat slurry.

After depositing the topcoat, the depositing block was removed from the topcoat slurry with the vacuum on the block intact. After 5 minutes, the vacuum on the block was observed to be at 28.5 inches (72 cm) of mercury. The depositing block assembly was placed in an oven maintained at 150° F. (65.6° C.) with the vacuum still attached for 245 minutes. The vacuum was discontinued and the synthetic pelt was removed from the depositing block and weighed. The final weight of the pelt was 24.4 grams, for a net topcoat increase of 2.02 grams, which equated to 0.051 pounds per square foot basis weight (0.25 kg/square meter).

The topcoated synthetic pelt was placed on top of a steel screen laboratory cathode and fitted to a laboratory electrolytic cell between 3 inch×3 inch (7.6 cm×7.6 cm) open EPDM gaskets. The anode/diaphragm space was set to $^3/_{16}$ inch (0.5 cm) by the gasket spacing. The cell was flushed with deionized water for 15.25 hours. Water in the cell was drained and replaced with sodium chloride brine having an approximate concentration of 305 grams/liter, and the cell heated to 195° F. (90.5° C.). The cell was energized with direct current 130 minutes after brine flow was initiated. The current setting was 9.0 amperes, which equated to 144 amperes/square foot (ASF) current density.

The cell was operated for 89 days. The average corrected caustic current efficiency of the cell was 97.1%. The average amount of chlorate in the cell liquor was 0.06 weight percent.

Example 2

The procedure of Example 1 was followed except that the topcoat slurry did not contain magnesium hydroxide. The electrolytic cell containing this diaphragm was operated simultaneously with the diaphragm of Example 1 for 89 days. The average corrected caustic current efficiency of the cell was 96.7% and the average amount of chlorate in the cell liquor was 0.14 weight percent. Compared to Example 1, the data for this electrolytic cell showed a higher level of chlorate in the cell liquor, which is reflected also in the reported lower caustic current efficiency.

Example 3

A topcoat slurry was prepared in a commercial size tank at ambient conditions by adding the following materials to the tank while mixing the mixture with 6 paddle-type mixers positioned around the periphery of the tank: 10,625 gallons (40,220 liters) of water, 53.2 pounds (24.1 kg) of tetrasodium pyrophosphate, 656 pounds (297.5 kg) of zirconium dioxide (Zirox 180), 164 pounds (74.4 kg) of clay mineral (Attagel 36), 66.5 pounds (30.2 kg) of magnesium hydroxide, and 42.5 liters of an Avanel N-925 nonionic surfactant solution (90% surfactant, 10% water). The slurry was used to topcoat cathode elements used in chlor-alkali electrolyzers. After each cathode element was coated, the amount of slurry used was calculated and an amount of each of the slurry components that was calculated to make-up for the amount of slurry used was added to the tank. In this way, the concentration of each of the components comprising the slurry was maintained at approximately the same as the original concentrations.

Bipolar cathode elements for a chlor-alkali electrolytic cell that contained a synthetic base mat were topcoated in the topcoat slurry tank previously described. Examples of the process used to topcoat two such cathode elements are now described. Cathode element A having a synthetic diaphragm base mat having a basis weight of 0.47 pounds/ft$^2$ (2.3 kg/m$^2$) was connected to a vacuum pump. The element was immersed in the topcoat slurry tank, which contained approximately 10.4 grams per liter of solids, and full vacuum was applied, which pulled topcoat slurry through the diaphragm, thereby depositing topcoat solids on and within the diaphragm. After 30 minutes of full vacuum, the vacuum had increased from an initial value of 0.5 inches (1.3 cm) of mercury to 14.6 inches (37.1 cm) of mercury. The cathode was lifted from the tank with continued vacuum and maintained in that condition for from 45 to 60 minutes, at which time the vacuum (ending vacuum) was 23.6 inches (60 cm) of mercury. The cathode element was dried under vacuum at 150° F. (66° C.). Testing showed that the dried diaphragm had approximately 0.105 pounds/ft$^2$ (0.5 kg/m$^2$) of topcoat applied.

A second cathode element B was topcoated in the same manner as that of cathode element A, except that the topcoat slurry was calculated to have a concentration of 10.3 grams/liter solids and the base mat had a basis weight of 0.476 pounds/ft$^2$ (2.3 kg/m$^2$). After 30 minutes of topcoat deposition, the vacuum had increased to 14.2 inches (36 cm) of mercury, and the ending vacuum value was 21.6 inches (54.8 cm). Testing showed that this dried diaphragm had approximately 0.07 pounds/ft$^2$ (0.34 kg/m$^2$) of topcoat applied.

A bipolar chlor-alkali electrolyzer was prepared by installing cathode elements A and B and other similarly coated cathode elements in the electrolyzer. This electrolyzer and 8 similar electrolyzers, each of which were prepared with cathode elements that were topcoated in the manner described above, were operated in a chlor-alkali (sodium chloride) electrolytic circuit. The other 8 electrolyzers were prepared at different times. The age of these 9 electrolyzers varied from 2 to 13 weeks. Data collected for these 9 electrolyzers represented a total of 61 electrolyzer weeks of operation (the sum of a value obtained by multiplying each electrolyzer by the number of weeks it has been operating).

The data collected for these 9 electrolyzers showed that the average chlorate value in the sodium hydroxide cell liquor for this group of electrolyzers was 33% lower than the average chlorate value in sodium hydroxide cell liquor observed for 4 similar synthetic diaphragm electrolyzers (operated during a different time period but under the same electrolytic circuit operating conditions) that were prepared with similar but non-magnesium hydroxide-containing topcoat compositions even though the sodium hydroxide cell liquor concentration varied by only 1.4 g/l between topcoat types.

The data of the Examples shows that a chlor-alkali synthetic diaphragm that is coated with a topcoat composition that includes valve metal oxide, clay mineral, alkali metal polyphosphate and magnesium hydroxide produces less chlorate ion in the cell liquor than similar chlor-alkali synthetic diaphragms having a topcoat composition that does not contain the magnesium hydroxide.

The present invention has been described with reference to specific details of particular embodiments thereof. However, it is not intended that such details be regarded as limitations upon the scope of the invention except insofar as and to the extent that they are included in the accompanying claims.

What is claimed is:

1. A liquid-permeable diaphragm for use in a chlor-alkali electrolytic cell comprising:
   (a) a liquid-permeable base mat, said base mat comprising synthetic polymeric material that is at least partially resistant to the environment within said electrolytic cell, and
   (b) a coating of water-insoluble particulate material on said base mat, the water-insoluble particulate material having been deposited on said base mat from an aqueous slurry of water and particulate material consisting essentially of:
      (i) at least one oxide, boride, carbide, nitride or silicate of a valve metal,
      (ii) clay mineral,
      (iii) hydrous metal oxide chosen from the hydrous oxides of magnesium, the hydrous oxides of zirconium, and mixtures of said hydrous metal oxides, and
      (iv) from 0.01 to 2 weight percent of alkali metal polyphosphate.

2. The diaphragm of claim 1 wherein the synthetic polymeric material of the base mat is a halogen-containing polymer fiber chosen from fluorine-containing polymer fibers, fluorine and chlorine-containing polymer fibers, and mixtures of such halogen-containing polymer fibers.

3. The diaphragm of claim 2 wherein the fluorine-containing polymer fiber is polytetrafluoroethylene.

4. The diaphragm of claim 2 wherein the aqueous slurry of water-insoluble particulate material comprises:
   (i) at least one valve metal oxide,
   (ii) clay mineral chosen from hydrated aluminum silicates, hydrated magnesium silicates, hydrated aluminum magnesium silicates, and mixtures of such hydrated silicates,
   (iii) hydrous metal oxide chosen from the hydrous oxides of magnesium, the hydrous oxides of zirconium and mixtures of such hydrous metal oxides, and
   (iv) from 0.1 to 1 weight percent of alkali metal polyphosphate.

5. The diaphragm of claim 4 wherein the aqueous slurry of water-insoluble particulate material comprises on a solids basis:
   (i) from 40 to 90 weight percent of the valve metal oxide,
   (ii) from 15 to 60 weight percent of the clay mineral, and
   (iii) from 0.5 to 33 weight percent of the hydrous metal oxide.

6. The diaphragm of claim 5 wherein alkali metal polyphosphate is present in the aqueous slurry in amounts of from 0.1 to 0.5 weight percent.

7. The diaphragm of claim 6 wherein the alkali metal polyphosphate is tetrealkali metal pyrophosphate.

8. A liquid-permeable diaphragm assembly for use in a chlor-alkali electrolytic cell comprising:
   (a) a foraminous cathode,
   (b) a liquid-permeable base mat on said foraminous cathode, said base mat comprising synthetic polymeric material that is at least partially resistant to the environment within said electrolytic cell, and
   (c) a coating of water-insoluble particulate material on said base mat, the water-insoluble particulate material having been deposited on said base mat from an aqueous slurry of water and particulate material consisting essentially of:
      (i) at least one oxide, boride, carbide, nitride or silicate of a valve metal,
      (ii) clay mineral,
      (iii) hydrous metal oxide chosen from the hydrous oxides of magnesium, the hydrous oxides of zirconium, and mixtures of said hydrous metal oxides, and
      (iv) from 0.01 to 2 weight percent of alkali metal polyphosphate.

9. The diaphragm assembly of claim 8 wherein the synthetic polymeric material of the base mat is a halogen-containing polymer fiber chosen from fluorine-containing polymer fibers, fluorine and chlorine-containing polymer fibers, and mixtures of such halogen-containing polymer fibers.

10. The diaphragm assembly of claim 9 wherein the fluorine-containing polymer fiber is polytetrafluoroethylene.

11. The diaphragm assembly of claim 9 wherein the aqueous slurry of water-insoluble particulate material comprises:
   (i) at least one valve metal oxide,
   (ii) clay mineral chosen from hydrated aluminum silicates, magnesium silicates, hydrated aluminum magnesium silicates, and mixtures of such hydrated silicates,
   (iii) hydrous metal oxide chosen from the hydrous oxides of magnesium, the hydrous oxides of zirconium and mixtures of such hydrous metal oxides, and
   (iv) from 0.1 to 1 weight percent of alkali metal polyphosphate.

12. The diaphragm assembly of claim 11 wherein the aqueous slurry of water-insoluble particulate material comprises on a solids basis:
   (i) from 40 to 90 weight percent of the valve metal oxide,
   (ii) from 15 to 60 weight percent of the clay mineral, and
   (iii) from 0.5 to 33 weight percent of the hydrous metal oxide.

13. The diaphragm assembly of claim 12 wherein alkali metal polyphosphate is present in the aqueous slurry in amounts of from 0.1 to 0.5 weight percent.

14. The diaphragm assembly of claim 13 wherein the alkali metal polyphosphate is chosen from tetrasodium pyrophosphate, tetrapotassium pyrophosphate and mixtures of such alkali metal pyrophosphates.

15. In the method of electrolyzing alkali metal halide brine in an electrolytic diaphragm cell wherein the electrolytic cell comprises an anode compartment containing an anode and alkali metal halide brine, a cathode compartment, and a liquid-permeable diaphragm assembly separating the anode compartment and the cathode compartment, the improvement comprising electrolyzing alkali metal halide brine in an electrolytic diaphragm cell having a liquid-permeable diaphragm assembly comprising:
   (a) a foraminous cathode,
   (b) a liquid-permeable base mat on said foraminous cathode, said base mat comprising synthetic polymeric material that is at least partially resistant to the environment within said electrolytic cell, and
   (c) a coating of water-insoluble particulate material on said base mat, the water-insoluble particulate material having been deposited on said base mat from an aqueous slurry of water and particulate material consisting essentially of:
      (i) at least one oxide, boride, carbide, nitride or silicate of a valve metal,
      (ii) clay mineral,
      (iii) hydrous metal oxide chosen from the hydrous oxides of magnesium, the hydrous oxides of zirconium, and mixtures of said hydrous metal oxides, and
      (iv) from 0.1 to 1 weight percent of alkali metal polyphosphate, thereby minimizing the amount of chlorate ion produced during electrolysis of alkali metal halide brine.

16. The method of claim 15 wherein the alkali metal halide brine is sodium chloride brine.

17. The method of claim 16 wherein the liquid-permeable base mat of the diaphragm assembly comprises polytetrafluoroethylene; and the aqueous slurry of water insoluble particulate material comprises (i) at least one valve metal oxide, (ii) clay mineral chosen from hydrated aluminum silicates, hydrated magnesium silicates, hydrated aluminum magnesium silicates, and mixtures of such hydrated silicates, (iii) hydrous metal oxide chosen from the hydrous oxides of magnesium, the hydrous oxides of zirconium, and mixtures of said hydrous metal oxides, and (iv) tetraalkali metal pyrophosphate.

18. The method of claim 17 wherein the aqueous slurry of water-insoluble particulate material comprises:
   (i) from 50 to 80 weight percent of valve metal oxide,
   (ii) from 18.5 to 40 weight percent of clay mineral, and
   (iii) from 5 to 25 weight percent of hydrous metal oxide, and
   (iv) from 0.1 to 0.5 weight percent of tetraalkali metal pyrophosphate.

19. A method for forming an electrolyte-permeable synthetic diaphragm on a foraminous cathode structure for use in a chlor-alkali electrolytic cell, said method comprising:
   (a) depositing a liquid-permeable base mat on said cathode structure, said base mat comprising synthetic polymeric material chosen from fluorine-containing polymer fibers, fluorine and chlorine-containing polymer fibers, and mixtures of such halogen-containing polymer fibers, said base mat having been deposited from an aqueous slurry of said synthetic polymeric material,
   (b) coating said deposited base mat with a coating consisting essentially of water-insoluble particulate material of:
      (i) at least one valve metal oxide,
      (ii) clay mineral chosen from hydrated aluminum silicates, hydrated magnesium silicates, hydrated aluminum magnesium silicates, and mixtures of such hydrated silicates,
      (iii) hydrous metal oxide chosen from hydrous oxides of magnesium, the hydrous oxides of zirconium, and mixtures of such hydrous metal oxides, and
      (iv) from 0.1 to 1 weight percent of tetraalkali metal pyrophosphate, and
   (c) drying the resultant formed diaphragm.

20. The diaphragm of claim 19 wherein the aqueous slurry of water-insoluble particulate material comprises on a solids basis:
   (i) from 40 to 90 weight percent of the valve metal oxide,
   (ii) from 15 to 60 weight percent of the clay mineral, and
   (iii) from 0.5 to 33 weight percent of the hydrous metal oxide.

* * * * *

UNITED STATES PATENT AND TRADEMARK OFFICE
CERTIFICATE OF CORRECTION

PATENT NO. : 8,460,536 B2
APPLICATION NO. : 11/334907
DATED : June 11, 2013
INVENTOR(S) : Schussler Page 1 of 1

It is certified that error appears in the above-identified patent and that said Letters Patent is hereby corrected as shown below:

In the Claims

Column 16, Line 42, Claim 7, delete "tetrealkali" and insert -- tetraalkali --

Signed and Sealed this
Thirteenth Day of May, 2014

Michelle K. Lee
*Deputy Director of the United States Patent and Trademark Office*